July 30, 1935. G. M. KILCARR Re. 19,659

LOADING DEVICE

Original Filed May 11, 1929 3 Sheets-Sheet 1

Gilbert M. Kilcarr
INVENTOR
BY Mock & Blum
ATTORNEYS

July 30, 1935. G. M. KILCARR Re. 19,659
LOADING DEVICE
Original Filed May 11, 1929 3 Sheets-Sheet 2
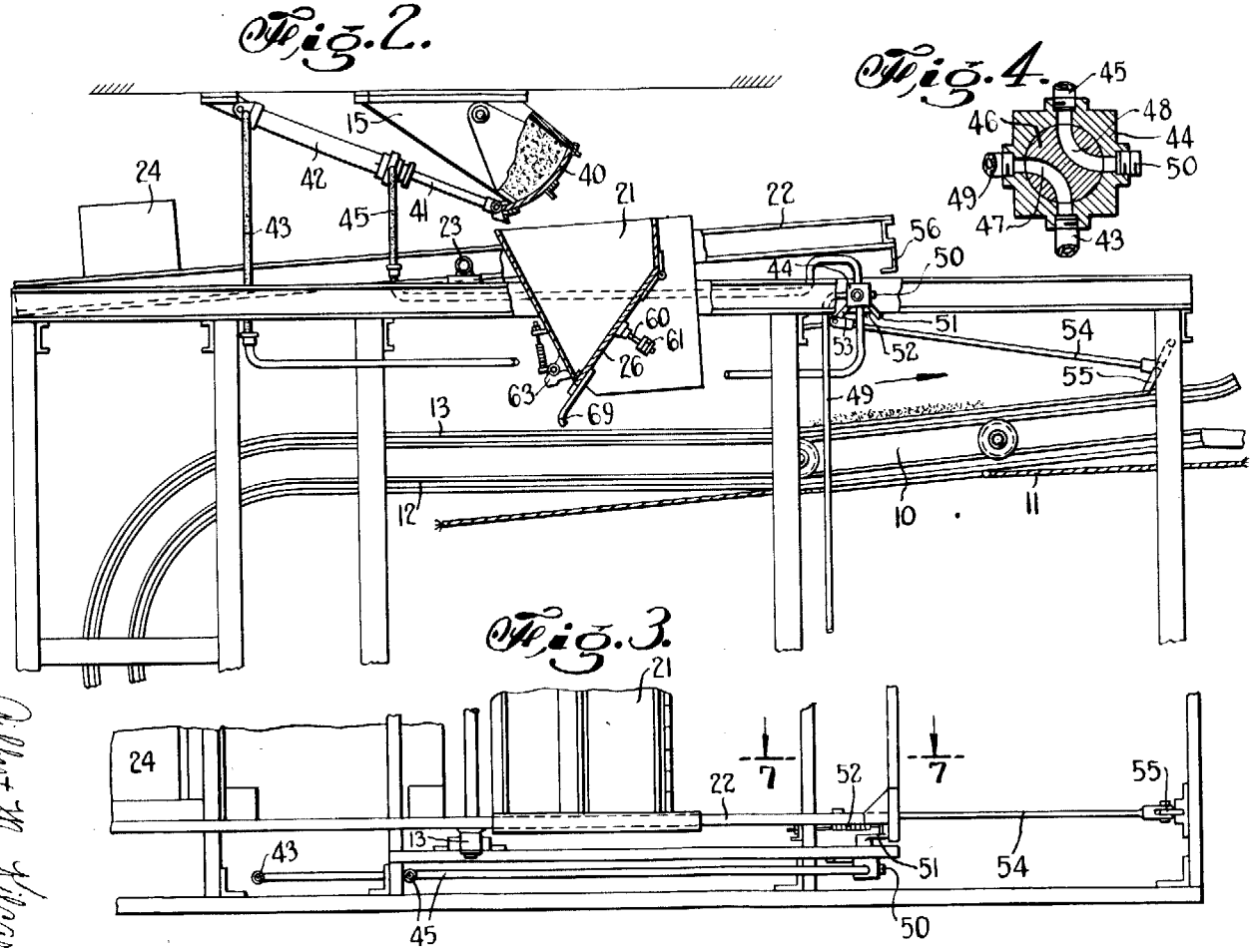
Gilbert M. Kilcarr
INVENTOR
BY Mock & Blum
ATTORNEYS July 30, 1935. G. M. KILCARR Re. 19,659
LOADING DEVICE
Original Filed May 11, 1929 3 Sheets-Sheet 3
Fig. 5.
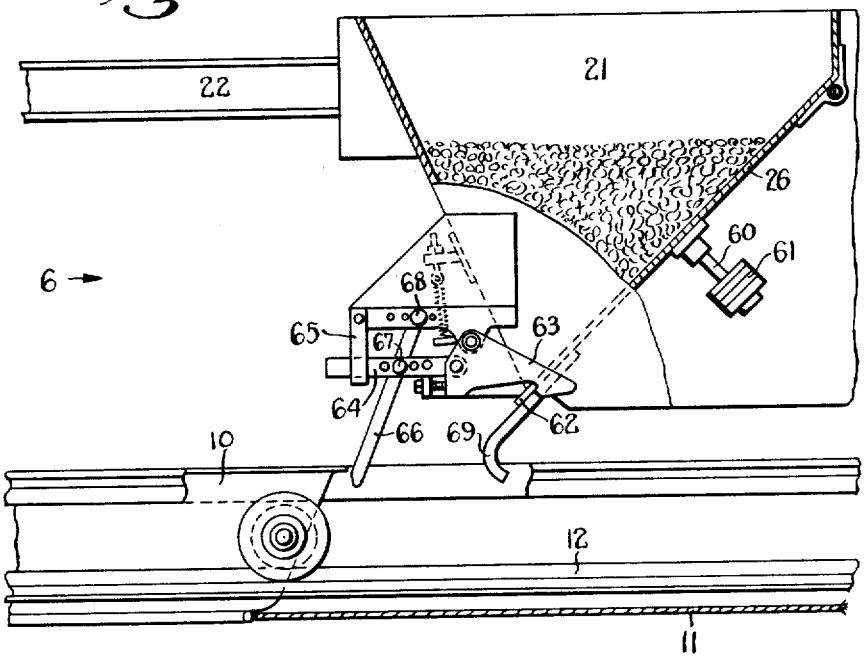
Fig. 7.
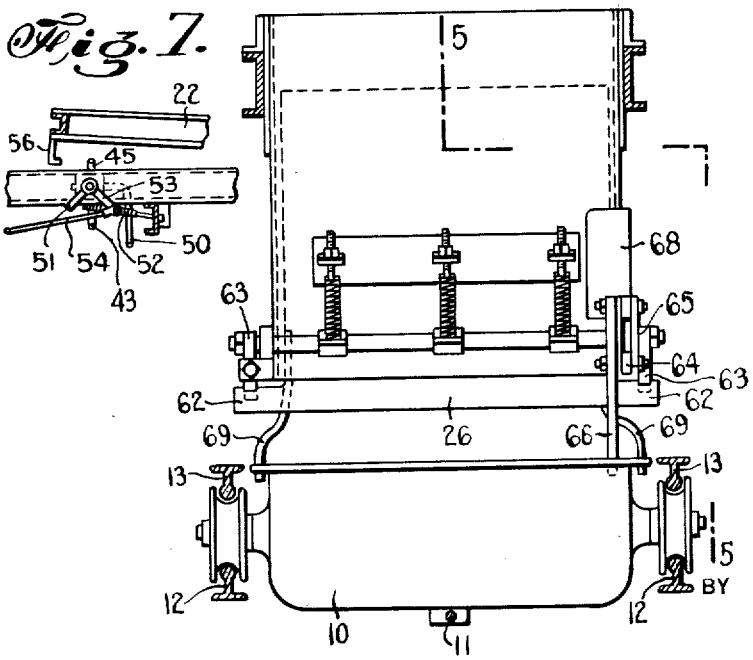
Fig. 6.
Gilbert M. Kilcarr
INVENTOR
BY Hock & Blum
ATTORNEYS Reissued July 30, 1935

Re. 19,659

UNITED STATES PATENT OFFICE 19,659

LOADING DEVICE

Gilbert M. Kilcarr, New York, N. Y., assignor to Interstate Equipment Corporation, New York, N. Y., a corporation of New York Original No. 1,834,787, dated December 1, 1931, Serial No. 362,217, May 11, 1929. Application for reissue October 25, 1933, Serial No. 695,142

13 Claims. (Cl. 214—42)

This invention relates to loading devices.

It is among the objects of the present invention to provide a novel and improved loading device particularly adapted for the loading of cable-drawn tramway cars.

It is a further object of the present invention to provide a device of the character described of the batch loader type which will deliver to a tramway car a predetermined quantity of material.

A further object of the present invention is to provide a device of the character described, which will be automatically operated in response to movement of the tramway cars to load the same with a predetermined quantity of material.

A further object of the present invention is to provide in a device of the character described, a pivoted loading mechanism operable by gravity to control a feeding mechanism whereby a predetermined quantity of material will be supplied to the loader, after which the feeding mechanism will be stopped automatically.

Other objects of the present invention include the provision of a device having a novel and improved combination and interrelation of parts whereby the whole is simple in construction and operation and well designed to meet the demands of economic manufacture.

Other objects and features of the present invention will be apparent from a consideration of the following specification taken in conjunction with the accompanying drawings, in which Figure 1 is an illustration of one form of the present invention in which the control for the feeding mechanism is arranged for by suitable circuits and circuit closures;

Fig. 2 is a modified form of the invention in which a pneumatic control is used for the feeding mechanism;

Fig. 3 is a fragmentary top plan view of that form of the invention shown in Fig. 2;

Fig. 4 is a detail view of the valve shown in Fig. 2;

Fig. 5 is a side elevation in detail showing the loader door and assembly;

Fig. 6 is an end elevation looking in the direction of the arrow shown in Fig. 5, and Fig. 7 is a sectional view taken on lines 7—7 of Fig. 3.

Figure 1:
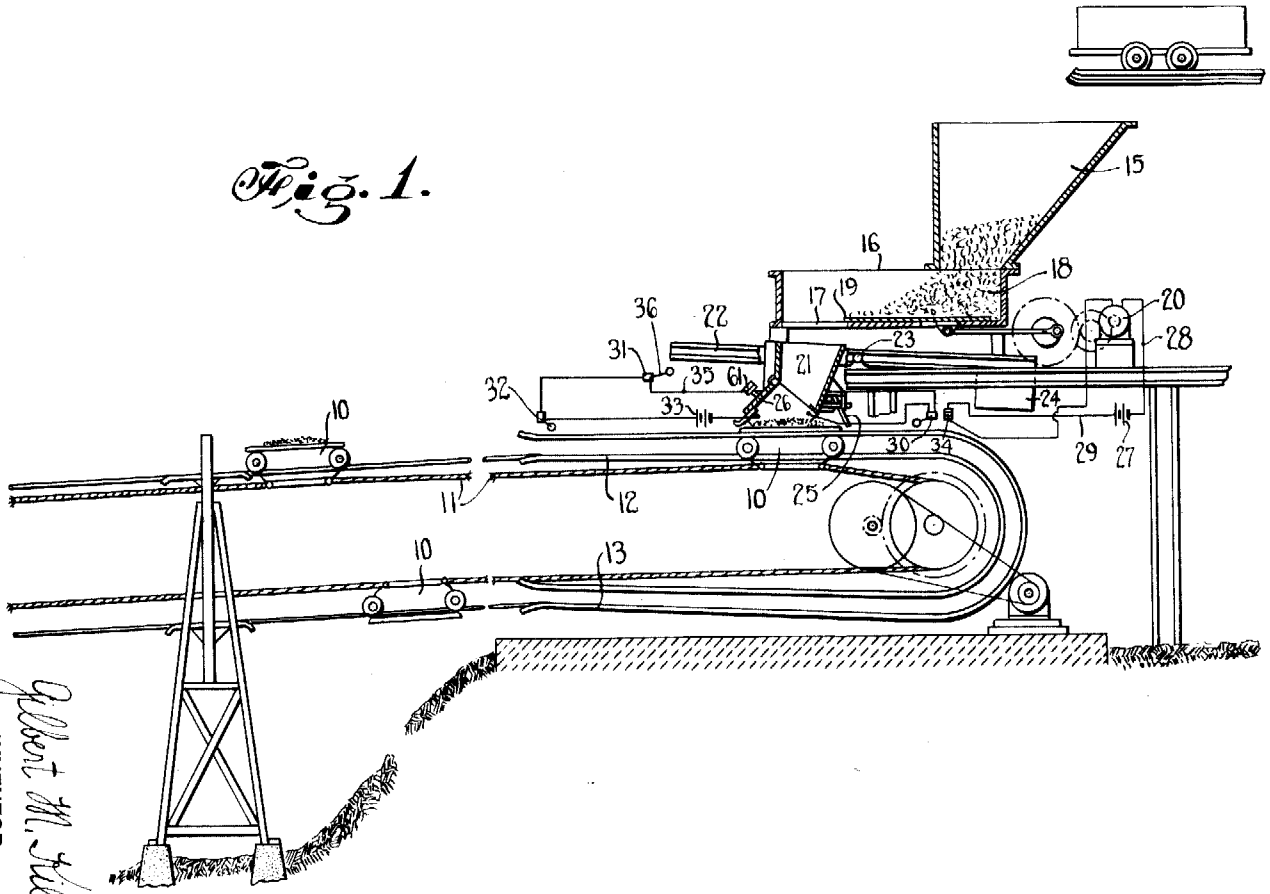

Referring more particularly to Fig. 1, the present invention is shown in combination with a tramway car system which includes cars or carriers 10, cables 11 and upper and lower track sections 12 and 13, respectively. In this connection it will be noted that the lower track 13 is bent to form a guide for the upper track 12, while the upper track 12 is turned downwardly to form a guide for the lower track 13. It will be understood that the present invention is, however, not confined to the specific tramway system herein disclosed and that the invention may be used in the loading of material regardless of the type of car to which material is loaded or conveyor system therefor.

The present invention includes a suitable hopper 15 to which material is supplied in any desired manner, the lower end of the hopper discharging into a feeder bin 16 the floor at the forward end of which is apertured as at 17, the material indicated at 18 being arranged to be supplied through the aperture 17 by movement of a feeder plate 19 arranged for mechanical association for movement in response to the energization of an electrical motor 20. Mounted adjacent the aperture 17, a loader bin 21 is provided suitably supported on a pivoted cradle 22 which is pivoted as at 23 and counterbalanced by a weight 24, whereby the normal position of the loader bin 21 when empty will be in raised position as shown in Fig. 1. When the loader bin is full, however, the weight of the material therein will counterbalance the weight 24 and the cradle 22 will move downwardly to control the electrical circuit of the motor 20, as will be hereinafter described.

For automatically discharging material from the loader bin 21 to the car 10 when the car is properly positioned thereunder, an operating arm 25 mounted upon the bin 21 is provided, which is adapted to be operated by the car to permit the feeder door 26 of the bin 21 to open by gravity and by the weight of the material in the hopper, thus discharging the material to the car 10. One preferred embodiment of the loader door controlling mechanism is shown in detail in Fig. 5 and will be hereinafter discussed in connection therewith. For automatically controlling the feeder motor 20 in response to movement of the cars 10, reference may be had to the electrical circuit associated therewith, which includes the usual source of potential 27 connected by a conductor 28 with one side of the motor 20, while the other side of the motor is associated through the conductor 29 with a magnetically controlled switch 34. For energizing the switch 34 to start or stop the motor 20 the circuit controller 30 is mounted adjacent the upper track 12, whereby passage of the car to position under the loader will open the motor circuit, thus preventing operation of the feeding mechanism during the time the door 26 is open. At the end of the upper track 12, a circuit controller 32 is provided in series with the controller 30, the circuit including a source of potential 33 and which is adapted to control the relay 34 mounted in conjunction with the circuit controller 30, the arrangement being such that as the car passes the circuit controller 30, the circuit will be broken, thus stopping the feeding motor 20. After the car has been fully loaded, as its passes from the tracks the circuit controller 32 is operated, whereby the relay 34 will be energized and the motor reenergized.

The circuit controller 30 is also associated by a conductor 35 with the circuit controller 31, which is mounted adjacent the end of the cradle 22, its normal position being closed with its operating arm 36 up. When the bin 21 is full, the cradle 22 will move downwardly thus striking the arm 36 and breaking the circuit to the motor 20, which circuit remains broken until such time as the hopper is empty and the cradle again resumes the position shown in Fig. 1.

From the foregoing it will readily be seen that the circuit controllers 30 and 32 provide a safety device so that should the bin 21 be only partially full when the car approaches the mouth of the bin, the motor will be automatically shut off, thus preventing the operation of the feeding movement during the loading from the bin 21. The circuit for the relay 34 also includes the door of the bin 21 closing of which completes the circuit, the arrangement being such that operation of the motor is prevented while the door is open. It will be understood that the electrical circuit involved is only diagrammatically shown and the present invention is not confined to any specific structure of circuit controllers or relays therefor.

It will be readily understood that the present invention may be arranged for pneumatic motive power in lieu of the electrical circuit involved as shown in Fig. 1. One form of the present invention which utilizes pneumatic control has been illustrated in Figs. 2 to 7 The form of the invention shown in Fig. 1 is designed primarily for the loading of solid or semi-solid material which will not flow freely. Thus the motor controlled feeding mechanism is required. The pneumatic system, however, is arranged for use with free flowing material and thus the feeding mechanism is displaced by a small gate which controls the discharge of the material to the loader bin.

Referring more particularly to Fig. 2, the loader bin 21 and cradle 22 are provided, the cradle being pivoted as at 23 to a suitable support or structure which is arranged adjacent the upper track 12 over which the cars 10 are drawn by the cable 11, substantially as shown in Fig. 1.

For controlling the feed of the material from the feeder bin 15 to the loader bin 21, a pivoted loading gate 40 is provided, operatively associated with a controlling plunger 41, which extends from a cylinder 42 arranged for pneumatic operation of the plunger 41. For closing the gate 40, the rear end of the cylinder 42 is associated with a tubing 43, which leading to a double-acting valve 44, shown in detail in Fig. 4. For opening the gate 40, the forward end of the cylinder 42 is associated with a tubing 45 which also leads to the valve 44. Within the valve 44 a valve plug 46 is arranged having a pair of angular valve ports 47 and 48, the port 47 being arranged to connect either the tubing 43 with an inlet connection 49 or the tubing 43 with the exhaust connection 50, while the port 48 is arranged for associating the tubing 45 with either the inlet or the exhaust. With the valve plug 46 arranged in the position shown in Fig. 4, it will be seen that air from a suitable source (not shown) passes from the inlet 49 through the tubing 43 to move the plunger 41 to close the gate 40, while the air in front of the plunger of the cylinder 42 passes through the tubing 45 to the port 48 to the exhaust 50. With the plug 46 rotating a quarter turn in counterclockwise direction, the port 47 will connect the exhaust 50 with the tubing 43, whereby the pressure will be admitted to the opposite end of the cylinder and the gate will be opened and will be retained so.

For actuating the valve plug 46, an extending control lever 51 is provided, which through association with a spring 52 normally retains the plug in the position shown in Fig. 4. Associated with the lever 51, an angularly related arm 53 is connected by a link 54 to an operating lever 55 mounted adjacent the extremity of the upper track 12, and mounted to be struck by the car as it passes from the track whereby the link 54 will be moved to rotate the plug in counter-clockwise direction, thus connecting the inlet port 49 with the tubing 45, whereby the plunger 41 will be forced rearwardly and the gate 40 will be opened and will be retained open until the bin 21 receives its predetermined quantity of material, whereby the cradle 22 will outbalance the weight 24 and the cradle will move downwardly carrying with it an appended arm 56 which will strike the lever 51 and rotate the plug in clockwise direction, thus connecting the tubing 43 with the inlet port 49, whereupon the plunger 41 will be forced forwardly, closing the gate 40.

The form of the invention thus presented has no associated means for preventing the opening of the gate 40 when the car is under the loader bin, as provided by the circuit controller 30 in Fig. 1. It will be readily understood that suitable mechanical means equivalent to the switch or controller 30 may be provided without departing from the spirit or scope of the present invention.

For automatically opening the door 26 of the bin 21, the structure presented more specifically in Figs. 5 and 6 may be referred to. For closing the door 26 when the bin 21 is empty, the outer face of the door is provided with an angularly extending arm 60, the extremity of which carries weights 61, the arrangement being such that at the end of the loading period, the door will close by gravity, the weights providing sufficient inertia to swing the door past its normal depending position, to lock the same by the engagement of extending side portions 62 of the door with pivoted dogs 63. For pivotally moving the dogs 63 to release the door, a pivoted link 64 is provided associated with the dogs and extending outwardly thereof, being guided for movement by a suitable strap 65. Pivotally connected with the link 64, an operating arm 66 is provided, secured by a pin 67 to the link 64, its upper end being pivotally associated with a base 68 which is mounted upon the side of the bin 21 and which carries pivotally associated therewith, the dogs 63. The lower end of the arm 66 is adapted to normally lie in a position adjacent the track 12, whereby the car 10 will strike the same as it approaches the bin 21, thus forcing the link 64 forwardly to tilt upwardly the forward end of the dogs 63, thus releasing the portions 62 of the door 26. The door 26 is further provided with extending side portions 69 which are adapted to rest upon the side flanges of the car 10 and which by such engagement force the door to a fully opened position and retain it so that the car passes thereunder. It will be understood that after the car is loaded and it moves from engagement with the projecting portions 69 of the door, the door will be swung closed due to the inertia of the weights 61, and upon so swinging will engage the dogs 63, rocking them about their pivots so that the extending portions 62 of the door will be received and retained in the dogs 63, as shown in Fig. 5.

From the foregoing it will readily be seen that the invention provides a simple and efficient structure for carrying out the objects of the present invention as herein outlined. It will also be seen that the invention is applicable to pneumatic or electrical operation.

It will be understood that the invention is not confined to the specific structure or operating medium here shown and that numerous changes and modifications in the structural details and the full use of equivalents may be resorted to without departing from the spirit or scope of the invention as outlined in the appended claims.

What is claimed is:

1. The combination with a plurality of carriers, a feeder bin and a motor-actuated feeding device associated therewith, of a pivoted cradle, a loader bin carried by said cradle, means operable by movement of said cradle for controlling the operation of said motor, and means operable by movement of carriers in a position which is in advance of the loading position of said carriers under said loader bin to prevent actuation of said motor.

2. The combination with a plurality of carriers, a feeder bin and a motor-actuated feeding device associated therewith, of a pivoted cradle, a loader bin carried by said cradle, means operable by movement of said cradle for controlling the operation of said motor, means operable by movement of carriers in a position which is in advance of the loading position of said carriers under said loading hopper to prevent actuation of said motor, and means operable by movement of carriers from beneath said loader bin to permit actuation of said motor.

3. The combination with a plurality of carriers, a feeder bin and a motor-actuated feeding device associated therewith, of a pivoted cradle, a loader bin carried by said cradle, means operable by movement of said cradle for controlling the operation of the motor, means operable by movement of carriers adjacent said loader bin to prevent actuation of said motor, and means operable by movement of carriers adjacent said loader bin to permit actuation of said motor, said means including an electrical circuit for said motor, a carrier-actuated circuit controller and a cradle-actuated circuit controller.

4. The combination with a plurality of carriers, a feeder bin and a motor-actuated feeding device associated therewith, of a pivoted cradle, a loader bin carried by said cradle means operable by movement of said cradle for controlling the operation of said motor, means operable by movement of carriers adjacent said loader bin to prevent actuation of said motor, means operable by movement of carriers adjacent said loader bin to permit actuation of said motor, said means including an electrical circuit for said motor, a carrier-actuated circuit controller and a cradle-actuated circuit controller, and an associated circuit and relay for resetting said carrier-actuated circuit controller by movement of said carrier from beneath said loader bin.

5. In a loading device, a carrier movable past and under the device, a loader bin, coacting means on the carrier and loader bin for effecting the discharge of the contents of the latter into the former when it reaches a position thereunder, a feeder bin disposed over the loader bin, mechanism for feeding material from said feeder bin to the loader bin, means operable by the loader bin when filled for rendering the feeding mechanism inactive and means subsequently operable by the carrier in a position which is subsequent to and which is spaced wholly from the loading position of the carrier below the loading device for rendering said feeding mechanism active.

6. In a carrier loading device, a carrier movable past and under said loading device, a loader bin, coacting means on the carrier and loader bin for effecting the discharge of the contents of the latter into the former when it reaches a position thereunder, a feeder bin disposed over the loader bin, mechanism for feeding material from the feeder bin to the loader bin, means for rendering said feeding mechanism inactive when the loader bin is filled, means for rendering the feeding mechanism inactive when the loader bin is discharging, means operable by the carrier in a position which is in advance of the loading position of said carrier under the loader bin for rendering said feeding mechanism inactive, and means operable by the carrier when it is in a position which is subsequent to and which is spaced wholly from said loading position for permitting actuation of the feeding mechanism.

7. In a carrier loading device, a plurality of carriers successively movable past and under the device, a loader bin having an outlet, a closure therefor, hatch means for holding said closure in closed relation, means on the carriers for releasing the latch means when the carriers reach a loading position under the loader bin, a feeder bin disposed over the loader bin, mechanism for feeding material therefrom to the loader bin, means operable by the loader bin when filled for rendering the feeding mechanism inactive, means for preventing actuation of said feeding mechanism when the closure of the loader bin is opened and permitting actuation thereof when the closure of the loader bin is closed and means disposed in the path of movement of and operable by the carrier when said carrier is in a first position prior to and spaced from said loading position and when said carrier is in a position subsequent to and spaced from said loading position for respectively stopping and initiating the actuation of the feeding mechanism.

8. In combination, a plurality of carriers, a device for loading the same and past and under which device said carriers are successively moved, said device including a feeder bin, a subterposed carrier loading bin, a circuit including electrically actuated mechanism for feeding material from the feeder bin into the loader bin, means for mounting said loader bin for limited downward movement when filled, means for breaking the circuit to said mechanism when the loader bin is filled and depressed, said loader bin having a discharge outlet and a closure therefor releasable when the carrier reaches a position thereunder, means for breaking said feeding mechanism circuit when the loader closure is opened and for completing said circuit when it is closed, means for breaking the circuit to the feeding mechanism when the carriers approach the loading device and means for closing said circuit when the carriers leave the loading device.

9. In combination, a plurality of carriers and fixed means adapted to guide said carriers in a predetermined path, means external to said carriers for moving said carriers, a motor-driven feeder for supplying material to said carriers at a predetermined loading position in said path, and control means for said motor, said control means being operable by the movement of said carriers in positions which precede and follow said loading position and which are wholly spaced from said loading position.

10. In combination, a plurality of carriers and fixed means adapted to guide said carriers in a predetermined path, means external to said carriers for driving said carriers, a motor-driven feeder for supplying material to said carriers at a predetermined loading position in said path, and control means for said motor, said control means being operable by the movement of said carriers in control positions which precede and follow said loading position and which are wholly spaced from said loading position, said control positions of the carriers being adjacent said loading position.

11. In combination, a plurality of carriers and fixed means adapted to guide the same in a predetermined path, loading means having gate means and operable to successively load said carriers at a predetermined loading position in said path, control means for said gate means, said control means being operable by the movement of the carriers in said path in control positions of said carriers which precede and which follow and which are spaced wholly from said loading position, a member operable by the weight of a load, the movement of said member being effective to also operate said control means.

12. In combination, a plurality of carriers and means adapted to guide the same in a predetermined path, loading means operated by a motor and operable to successively load said carriers at a predetermined loading position in said path, control means for said motor, a member operable by the weight of a load, said control means being operable by the movement of said carriers in said path in control positions of said carriers which precede and which follow and which are spaced wholly from said loading position and being also operable by said weight-operated member.

13. A loading device comprising a chute having a first gate, a pivoted cradle, a hopper mounted on said cradle and located below the mouth of said chute, said hopper having a second gate, a motor for operating said first gate, a control device for said motor, a fixed track on which cars can move towards and away from said hopper, said control device being operable upon the descending movement of said hopper to cause said motor to close said first gate, said control device having a member projecting into the path of movement of said cars and operable by the movement of a car in a position which is subsequent to and which is spaced wholly from its loading position under the hopper, to cause said motor to open said first gate.

GILBERT M. KILCARR.